(12) United States Patent
Hattori

(10) Patent No.: US 11,539,253 B2
(45) Date of Patent: Dec. 27, 2022

(54) ROTATING ELECTRIC MACHINE AND METHOD OF CONTROLLING ROTATING ELECTRIC MACHINE

(71) Applicant: TOYOTA JIDOSHA KABUSHIKI KAISHA, Toyota (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/939,594

(22) Filed: Jul. 27, 2020

(65) Prior Publication Data

US 2021/0104926 A1 Apr. 8, 2021

(30) Foreign Application Priority Data

Oct. 2, 2019 (JP) .............................. JP2019-182525

(51) Int. Cl.
*H02K 1/27* (2022.01)
*H02K 21/16* (2006.01)
*H02K 1/276* (2022.01)

(52) U.S. Cl.
CPC ........... *H02K 1/2766* (2013.01); *H02K 21/16* (2013.01)

(58) Field of Classification Search
CPC ...... H02K 1/2766; H02K 21/16; H02K 21/14; H02K 21/046; H02K 21/028; H02P 6/08
See application file for complete search history.

(56) References Cited

U.S. PATENT DOCUMENTS

| 9,515,525 | B2 | 12/2016 | Shibata | |
|---|---|---|---|---|
| 2007/0145850 | A1 | 6/2007 | Hsu | |
| 2010/0213885 | A1* | 8/2010 | Ichiyama | H02K 21/12 |
| | | | | 310/156.46 |
| 2014/0021818 | A1* | 1/2014 | Shibata | H02K 21/14 |
| | | | | 310/156.11 |
| 2015/0137650 | A1* | 5/2015 | Takahashi | H02K 1/32 |
| | | | | 310/156.56 |

FOREIGN PATENT DOCUMENTS

| JP | 2004-242462 A | 8/2004 | |
|---|---|---|---|
| WO | 2015118400 A2 | 8/2015 | |
| WO | WO-2015118400 A2 * | 8/2015 | ............ H02K 21/028 |

* cited by examiner

*Primary Examiner* — Thomas Truong
(74) *Attorney, Agent, or Firm* — Sughrue Mion, PLLC

(57) ABSTRACT

A rotating electric machine includes: a rotary shaft member; a rotor including an annular rotor core having magnet housing holes; a stator including an annular stator core and a stator coil; a field yoke; and a field coil provided in the field yoke. Further, a bridge portion is provided between two magnet housing holes, an end surface in an axial direction at one end in a radial direction of the field yoke and an end surface in the axial direction of the bridge portion face each other in the axial direction, and an end surface in the axial direction at another end in the radial direction of the field yoke, and an end surface in the axial direction of the rotor core or an end surface in the axial direction of the stator core face each other in the axial direction.

9 Claims, 15 Drawing Sheets

ROTATING ELECTRIC MACHINE AND METHOD OF CONTROLLING ROTATING ELECTRIC MACHINE

CROSS-REFERENCE TO RELATED APPLICATION(S)

The present application claims priority to and incorporates by reference the entire contents of Japanese Patent Application No. 2019-182525 filed in Japan on Oct. 2, 2019.

BACKGROUND

The present disclosure relates to a rotating electric machine and a method of controlling the rotating electric machine.

In the related art, a rotating electric machine including a rotor having an annular rotor core in which a plurality of permanent magnets is provided, and a stator having an annular stator core arranged at an interval in a radial direction with respect to the rotor core, and a stator coil has been known.

In Japanese Laid-open Patent Publication No. 2004-242462, a rotor of a rotating electric machine in which rotor a plurality of magnet housing holes is provided in an outer periphery of an annular rotor core and a permanent magnet is housed in each of the magnet housing holes is disclosed. In the rotor core, two magnet housing holes adjacent to each other in a circumferential direction are arranged in a pair in such a manner as to be opened in a V-shape toward an outer side in a radial direction.

SUMMARY

There is a need for providing a rotating electric machine and a method of controlling the rotating electric machine that are capable of adjusting an amount of magnet magnetic flux that leaks to a bridge portion of a rotor core.

According to an embodiment, a rotating electric machine includes: a rotary shaft member that rotates about an axis; a rotor including an annular rotor core in which a plurality of pairs of magnet housing holes is arranged in a circumferential direction in an outer periphery and which is fixed to the rotary shaft member, each of the pairs of magnet housing holes respectively housing permanent magnets and being arranged in such a manner as to be opened in a V-shape toward an outer side in a radial direction; a stator including an annular stator core arranged at an interval in the radial direction with respect to the rotor, and a stator coil provided around the stator core; a field yoke arranged on an outer side of the rotor in an axial direction of the rotary shaft member; and a field coil that is provided in the field yoke and that generates field magnetic flux when energized. Further, a bridge portion is provided between two magnet housing holes that form the pair of magnet housing holes in the rotor core, an end surface in the axial direction at one end in the radial direction of the field yoke and an end surface in the axial direction of the bridge portion face each other in the axial direction, and an end surface in the axial direction at another end in the radial direction of the field yoke, and an end surface in the axial direction of the rotor core or an end surface in the axial direction of the stator core face each other in the axial direction.

According to an embodiment, a method of controlling a rotating electric machine, which includes a rotary shaft member that rotates about an axis, a rotor including an annular rotor core in which a plurality of pairs of magnet housing holes is arranged in a circumferential direction in an outer periphery and which is fixed to the rotary shaft member, each of the pairs of magnet housing holes respectively housing permanent magnets and being arranged in such a manner as to be opened in a V-shape toward an outer side in a radial direction, a stator including an annular stator core arranged at an interval in the radial direction with respect to the rotor, and a stator coil provided around the stator core, a field yoke arranged on an outer side of the rotor in an axial direction of the rotary shaft member, and a field coil that is provided in the field yoke and that generates field magnetic flux when energized, a bridge portion being provided between two magnet housing holes that form the pair of magnet housing holes in the rotor core, an end surface in the axial direction at one end in the radial direction of the field yoke and an end surface in the axial direction of the bridge portion facing each other in the axial direction, and an end surface in the axial direction at another end in the radial direction of the field yoke, and an end surface in the axial direction of the rotor core or an end surface in the axial direction of the stator core facing each other in the axial direction, includes: executing a first control mode of not performing energization of the field coil when a rotation speed of the rotating electric machine is to be increased; and executing a second control mode of performing energization of the field coil when output torque of the rotating electric machine is to be increased.

DETAILED DESCRIPTION

In a rotating electric machine including a rotor in which a plurality of pairs of magnet housing holes is arranged in an outer periphery of a rotor core, a part of magnetic flux (magnet magnetic flux) generated by a permanent magnet leaks to a bridge portion between two magnet housing holes that forms a pair of magnet housing holes in the rotor core. The magnetic flux generated by the permanent magnet leaks to the part of the bridge portion, and an amount of magnetic flux between the rotor and a stator is reduced. Thus, a back electromotive voltage is reduced and a rotation speed can be increased. On the other hand, when the magnetic flux generated by the permanent magnet leaks to the part of the bridge portion and the amount of magnetic flux between the rotor and the stator is reduced, torque is reduced and an output cannot be increased. Thus, in order to increase both of a rotation speed and an output, it is desired that an amount of magnet magnetic flux that leaks to the bridge portion can be adjusted.

First Embodiment

In the following, a first embodiment of a rotating electric machine and a method of controlling the rotating electric machine according to the present disclosure will be described. Note that the present disclosure is not limited to the present embodiment.

Figure 1:
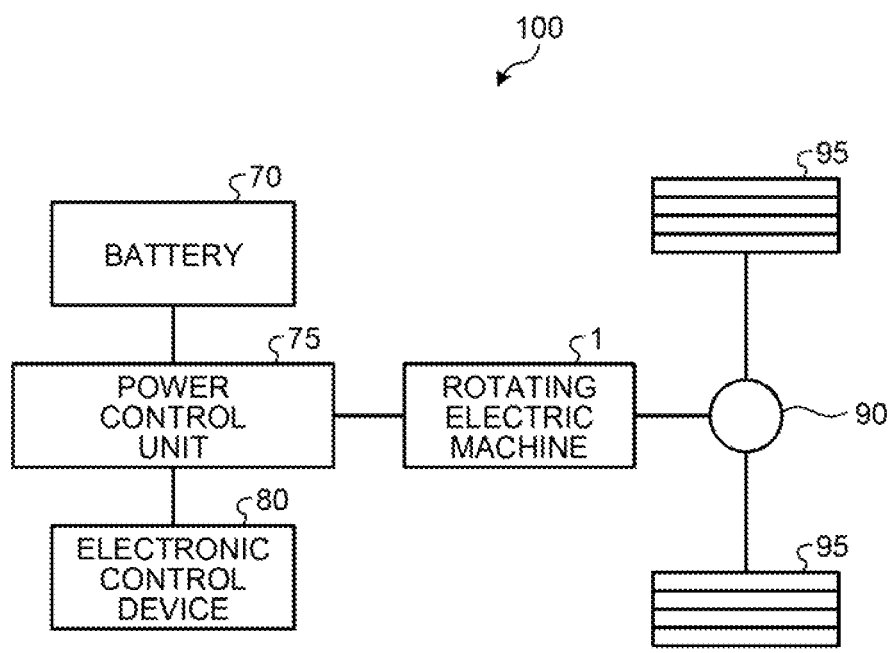
FIG. 1 is a block diagram illustrating a configuration of an electric vehicle to which a rotating electric machine according to a first embodiment is applied.

FIG. 1 is a block diagram illustrating a configuration of an electric vehicle 100 to which a rotating electric machine 1 according to the first embodiment is applied. The electric vehicle 100 includes the rotating electric machine 1, a battery 70, a power control unit 75, an electronic control device 80, a differential 90, a driving wheel 95 and the like.

The rotating electric machine 1 is, for example, a three-phase AC rotating electric machine. The rotating electric machine 1 has a function as an electric motor that outputs driving force for driving the driving wheel 95 via the differential 90 by using electric power supplied from the battery 70 via the power control unit 75. Also, the rotating electric machine 1 also has a function as a generator that generates electric power when the electric vehicle 100 is braked. The electric power generated by the rotating electric machine 1 is supplied to the battery 70 via the power control unit 75. In such a manner, the rotating electric machine 1 according to the first embodiment is a so-called motor generator.

The battery 70 is an electric storage device including a secondary battery such as a nickel-metal hydride battery or a lithium-ion battery. The battery 70 can be charged not only by electric power generated by the rotating electric machine 1, but also by electric power supplied from an external power supply. Note that the battery 70 is not limited to a secondary battery and may be an electric storage device that can generate a DC voltage and that can be charged, and may be a capacitor or the like.

The power control unit 75 has a function of converting DC power supplied from the battery 70 into AC power and supplying the AC power to the rotating electric machine 1, or converting AC power generated by the rotating electric machine 1 into DC power and supplying the DC power to the battery 70.

The electronic control device 80 includes a central processing unit (CPU), a random access memory (RAM), a read only memory (ROM) and the like, and controls the rotating electric machine 1 by controlling the power control unit 75 and adjusting an amount of electric power supplied from the battery 70 to the rotating electric machine 1 or the like.

Note that the rotating electric machine 1 according to the first embodiment can be also applied, for example, to a hybrid vehicle including an engine and a rotating electric machine.

Figure 2:
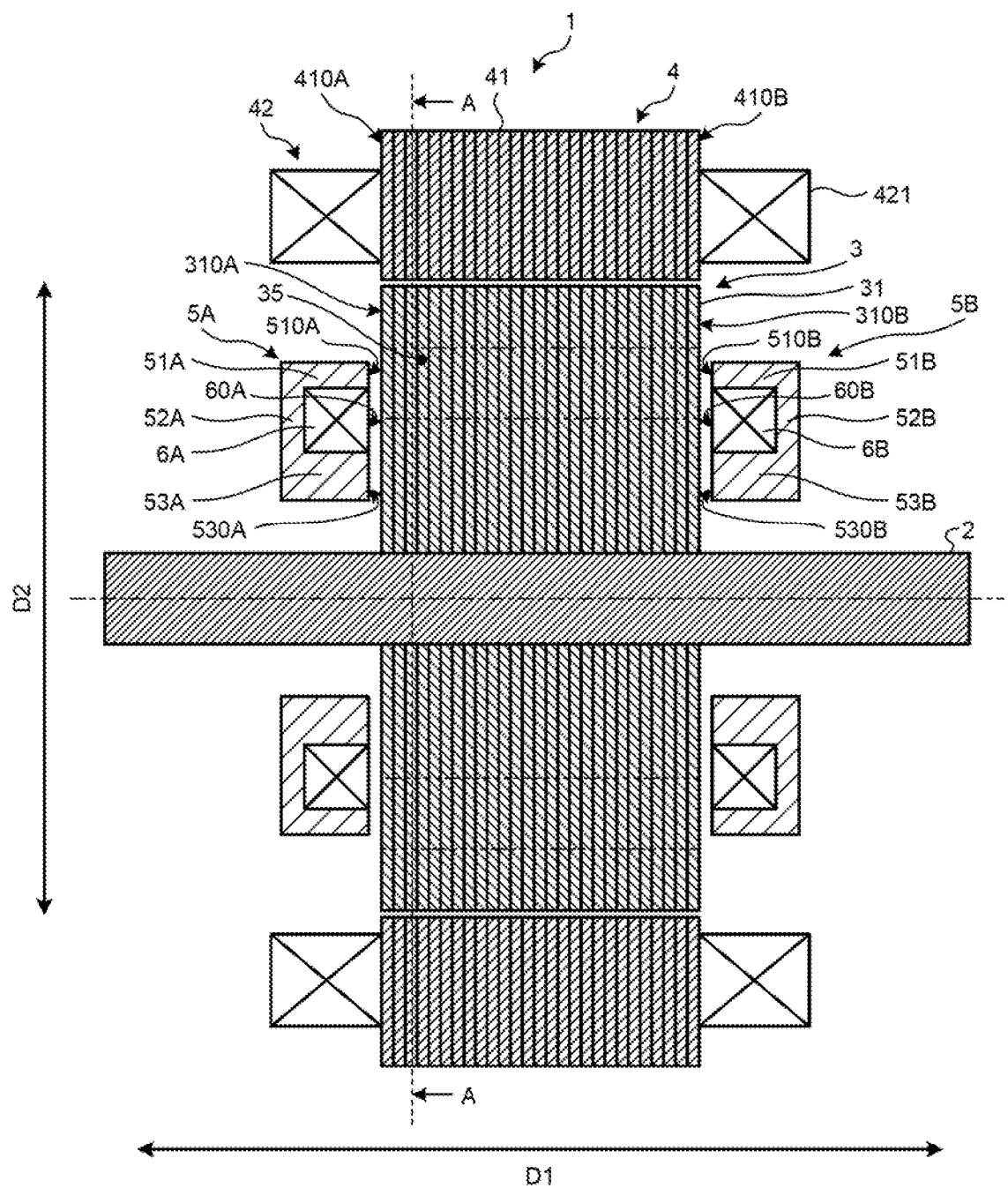
FIG. 2 is a cross-sectional view along an axis of the rotating electric machine according to the first embodiment.
Figure 3:
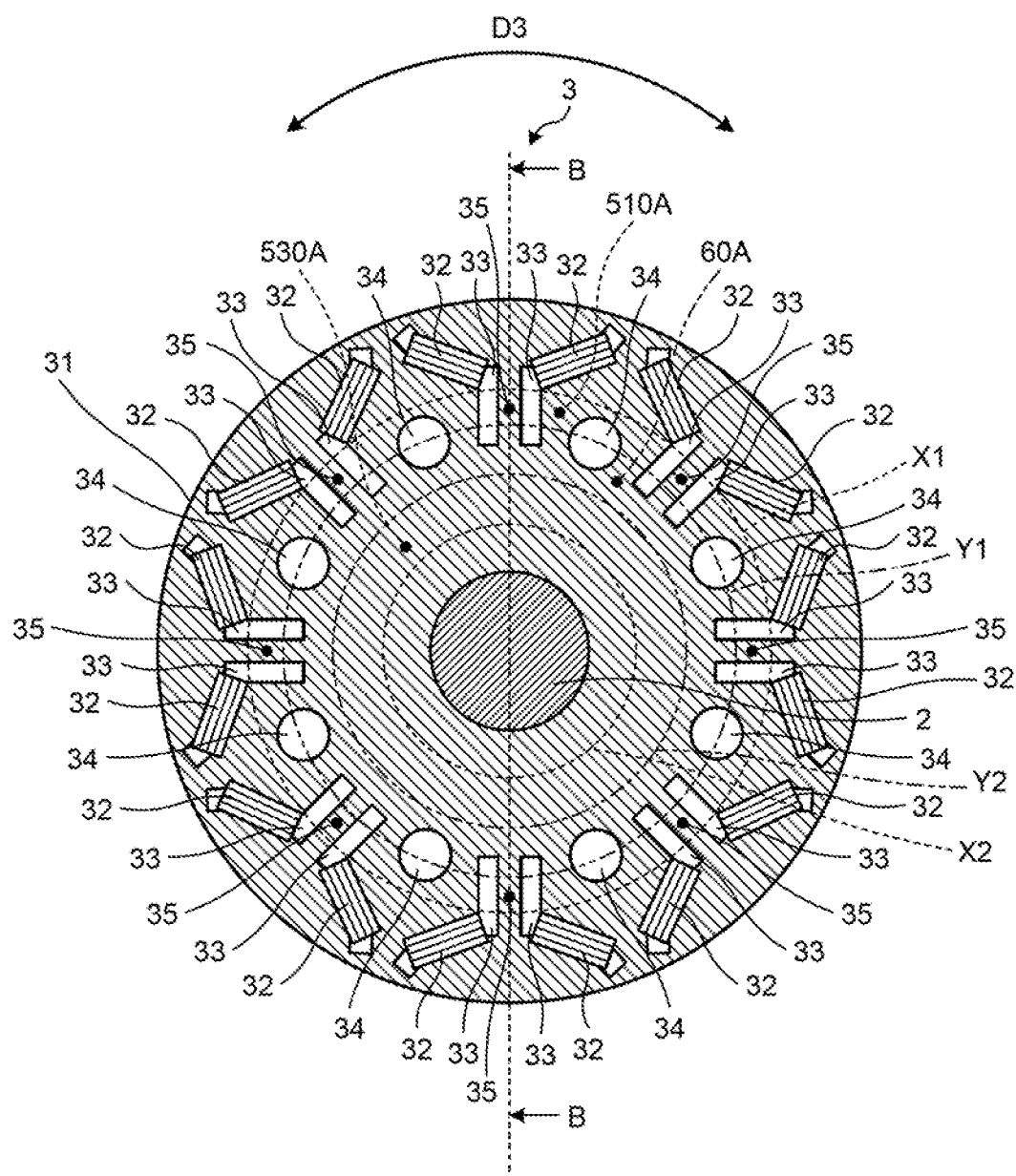
FIG. 3 is a cross-sectional view of a rotor along a line A-A in FIG. 2.

FIG. 2 is a cross-sectional view along an axis of the rotating electric machine 1 according to the first embodiment. FIG. 3 is a cross-sectional view of a rotor 3 along a line A-A in FIG. 2. Note that FIG. 2 is a cross-sectional view of the rotating electric machine 1 at a position corresponding to a line B-B in FIG. 3.

As illustrated in FIG. 2, the rotating electric machine 1 according to the first embodiment includes a shaft 2, a rotor 3, a stator 4, field yokes 5A and 5B, field coils 6A and 6B and the like.

The shaft 2 is a metal rotary shaft member that is long in an axial direction D1 and that can rotate about the axis. Note that in the following description, the "axial direction D1" is defined as an axial direction (longitudinal direction) of the shaft 2.

As illustrated in FIG. 3, the rotor 3 has a rotor core 31, a plurality of permanent magnets 32, a plurality of magnet housing holes 33, a plurality of magnetic flux leakage controlling holes 34, a plurality of central bridge portions 35 and the like.

The rotor core 31 is formed in a cylindrical shape by lamination of a plurality of electromagnetic steel sheets in the axial direction D1 of the shaft 2, and is fixed directly to the shaft 2 in such a manner as to be rotatable together with the shaft 2. Since the rotor core 31 has a gap between the electromagnetic steel sheets in the axial direction D1, magnetic resistance in the axial direction D1 is larger than magnetic resistance in a radial direction D2, which is a direction orthogonal to the axial direction D1, of the rotor core 31 and in a circumferential direction D3 of the rotor core 31. Thus, in the rotor core 31, magnetic flux does not easily flow in the axial direction D1, and the magnetic flux easily flows in the radial direction D2.

As illustrated in FIG. 3, the plurality of magnet housing holes 33 extended in the axial direction D1 is provided in an outer periphery of the rotor core 31. The magnet housing holes 33 are arranged in such a manner that two adjacent magnet housing holes 33 form a pair and form a V-shape opened toward an outer side in the radial direction. That is, the rotor core 31 includes a plurality of pairs of magnet housing holes 33 in the outer periphery, each pair being arranged in such a manner as to be opened in a V-shape toward the outer side in the radial direction. In the rotating electric machine 1 according to the first embodiment, 16 magnet housing holes 33 are provided in the rotor core 31.

A permanent magnet 32 having a rectangular parallelepiped shape is housed in each of the magnet housing holes 33. The permanent magnets 32 respectively housed in the pair of magnet housing holes 33 are arranged in such a manner that directions of polarity become the same. For example, each of north poles of a pair of permanent magnets 32 is arranged in such a manner as to face the outer side in the radial direction of the rotor core 31. Then, a different pair of permanent magnets 32 adjacent to this pair of permanent magnets 32 in the circumferential direction D3 is arranged in such a manner that south poles thereof face the outer side in the radial direction. In such a manner, a pair of permanent magnets 32 arranged in a V-shape form one magnetic pole. That is, the rotor 3 includes eight magnetic poles, each of which includes a pair of permanent magnets 32 arranged in such a manner as to be opened in a V-shape toward the outer side in the radial direction, in the outer periphery in such a manner that north poles and south poles are arranged alternately.

As illustrated in FIG. 3, a shape of each of the pairs of magnet housing holes 33 has a bilaterally symmetrical structure with a line of symmetry (not illustrated) intersecting with the axis of the shaft 2 being a center. Also, positions of a pair of permanent magnets 32 respectively housed in the pair of magnet housing holes 33 are also bilaterally symmetrical with the line of symmetry being a center. In each of the magnet housing holes 33, in a state in which the permanent magnet 32 is housed, a rectangular outer gap portion and inner gap portion are respectively formed in regions between short sides of the permanent magnet 32 on the outer side in the radial direction and an inner side in the radial direction and the rotor core 31. Here, the inner gap portion is extended to the inner side in the radial direction of the rotor core 31 along the line of symmetry. Note that resin for fixing the permanent magnet 32 to the magnet housing hole 33 may be injected into the outer gap portion and the inner gap portion.

Between two magnet housing holes 33 that form a pair of magnet housing holes 33 in the rotor core 31, more specifically, between inner gap portions of the two magnet housing holes 33 in the circumferential direction D3, a central bridge portion 35 is formed. The central bridge portion 35 is extended along the inner gap portions of the magnet housing holes 33.

Also, in the rotor core 31, a magnetic flux leakage controlling hole 34 that has a circular cross section orthogonal to the axial direction D1 and that penetrates in the axial direction D1 is provided, as a non-magnetic region, in a boundary of the magnetic poles adjacent to each other in the circumferential direction D3 and between a plurality of the central bridge portions 35 in the circumferential direction D3. In the rotating electric machine 1 according to the first embodiment, eight magnetic flux leakage controlling holes 34 are provided in the rotor core 31 concentrically. Note that as a shape of the magnetic flux leakage controlling holes 34, a cross section orthogonal to the axial direction D1 may not be circular and may be rectangular, for example. Also, the magnetic flux leakage controlling holes 34 may not penetrate the rotor core 31 in the axial direction D1. Furthermore, the inside of the magnetic flux leakage controlling holes 34 may be filled with a non-magnetic member such as resin or a non-magnetic metal.

Referring back to FIG. 2, the stator 4 includes a cylindrical stator core 41 arranged on an outer side in the radial direction D2 of the rotor core 31 at a predetermined interval, and a stator coil 42 wound around the stator core 41. The stator core 41 is configured by lamination of a plurality of electromagnetic steel sheets in the axial direction D1. Since the stator core 41 has a gap between the electromagnetic steel sheets in the axial direction D1, magnetic resistance in the axial direction D1 is larger than magnetic resistance in the radial direction D2 and the circumferential direction D3. Thus, in the stator core 41, magnetic flux does not easily flow in the axial direction D1, and the magnetic flux easily flows in the radial direction D2.

The field yokes 5A and 5B have a magnetic material, and are arranged on the outer side in the axial direction in the axial direction D1 of the rotor 3 and face each other with the rotor 3 placed therebetween in the axial direction D1, as illustrated in FIG. 2. The field yokes 5A and 5B respectively have cylindrical outer walls 51A and 51B, annular end walls 52A and 52B, and cylindrical inner walls 53A and 53B.

The outer walls 51A and 51B are one ends of the field yokes 5A and 5B in the radial direction D2, and are extended from outer peripheral edges in the radial direction D2 of the end walls 52A and 52B to a side of the rotor 3 in the axial direction D1. Also, inner end surfaces 510A and 510B in the axial direction D1 of the outer walls 51A and 51B and end surfaces in the axial direction D1 of the central bridge portions 35 provided in the rotor core 31 respectively face each other at a predetermined interval in the axial direction D1.

The end walls 52A and 52B are extended in the radial direction D2, and are respectively arranged in positions at a predetermined interval from both ends of the rotor core 31 in the axial direction D1.

The inner walls 53A and 53B are the other ends of the field yokes 5A and 5B in the radial direction D2, are extended in the axial direction D1, and are formed in such a manner a to be continuous with inner peripheral edges in the radial direction D2 of the end walls 52A and 52B, respectively. Also, inner end surfaces 530A and 530B in the axial direction D1 of the inner walls 53A and 53B and the end surfaces 310A and 310B in the axial direction D1 of the rotor core 31 respectively face each other at a predetermined interval in the axial direction D1. Also, the inner walls 53A and 53B are arranged at a predetermined interval from the shaft 2 in the radial direction D2.

Note that in FIG. 3, a first broken line circle X1, a first two-dot chain line circle Y1, a second two-dot chain line circle Y2, and a second broken line circle X2 are illustrated in this order from the outer side toward the inner side in the radial direction D2. Then, in FIG. 3, a position of the end surface 510A of the outer wall 51A in the field yoke 5A is expressed by a region sandwiched by the first broken line circle X1 and the first two-dot chain line circle Y1. Also, in FIG. 3, a position of the end surface 60A in the field coil 6A is expressed by a region sandwiched by the first two-dot chain line circle Y1 and the second two-dot chain line circle Y2. Also, in FIG. 3, a position of the end surface 530A of the inner wall 53A in the field yoke 5A is expressed by a region sandwiched by the second two-dot chain line circle Y2 and a second broken line circle X2.

As illustrated in FIG. 2 and FIG. 3, the end surface 510A of the outer wall 51A in the field yoke 5A faces all the central bridge portions 35 of the rotor 3 in the axial direction D1. Also, the end surface 530A of the inner wall 53A in the field yoke 5A faces, in the axial direction D1, the end surface 310A of the rotor core 31 on an inner side in the radial direction of the central bridge portion 35.

Note that in the field yoke 5B, the end surface 510B of the outer wall 51B in the field yoke 5B similarly faces all the central bridge portions 35 of the rotor 3 in the axial direction D1. Also, the end surface 530B of the inner wall 53B in the field yoke 5B faces, in the axial direction D1, the end surface 310B of the rotor core 31 on the inner side in the radial direction of the central bridge portion 35.

Field coils 6A and 6B are respectively provided on surfaces, on a side of the rotor 3 in the axial direction D1, of the end walls 52A and 52B. The field coils 6A and 6B can adjust an amount of field magnetic flux MF2 (see FIG. 6) (described later) that flows between the field yokes 5A and 5B and the rotor core 31 according to an amount of energization.

Note that in the rotating electric machine 1 according to the first embodiment, the field yokes 5A and 5B and the field coils 6A and 6B are arranged on an inner side of a coil end 421 of the stator coil 42 in the radial direction D2. Thus, a dimension in the radial direction D2 of the rotating electric machine 1 can be reduced.

Also, in the rotating electric machine 1 according to the first embodiment, it is desirable that the field coils 6A and 6B and the stator coil 42 at least partially overlap with each other when viewed in the radial direction D2. In other words, in the rotating electric machine 1 according to the first embodiment, it is desirable that the field coils 6A and 6B and the stator coil 42 are arranged in such a manner that positions thereof in the axial direction D1 at least partially overlap with each other. In the rotating electric machine 1 according to the first embodiment, at least a part of the field coils 6A and 6B overlaps with a coil end 421 of the stator coil 42 when the inner side is viewed from the outer side in the radial direction D2. In other words, in the rotating electric machine 1 according to the first embodiment, the field coils 6A and 6B and the coil end 421 of the stator coil 42 are arranged in such a manner that positions thereof in the axial direction D1 at least partially overlap with each other. Thus, a dimension of the rotating electric machine 1 in the axial direction D1 can be reduced.

Furthermore, in the rotating electric machine 1 according to the first embodiment, it is preferable that the field yokes 5A and 5B also at least partially overlap with the stator coil 42 in addition to the field coils 6A and 6B when viewed from the radial direction D2. In other words, in the rotating electric machine 1 according to the first embodiment, the field yokes 5A and 5B, the field coils 6A and 6B, and the stator coil 42 are preferably arranged in such a manner that positions thereof in the axial direction D1 at least partially overlap with each other. In the rotating electric machine 1 according to the first embodiment, at least a part of the field yokes 5A and 5B in addition to the field coils 6A and 6B overlaps with the coil end 421 of the stator coil 42 when the inner side is viewed from the outer side in the radial direction D2. In other words, in the rotating electric machine 1 according to the first embodiment, the field yokes 5A and 5B, the field coils 6A and 6B, and the coil end 421 of the stator coil 42 are arranged in such a manner that positions thereof in the axial direction D1 at least partially overlap with each other. Thus, a dimension of the rotating electric machine 1 in the axial direction D1 can be reduced.

In the rotating electric machine 1 according to the first embodiment, for example, a high rotation mode that is a first control mode executed when a rotation speed of the rotating electric machine 1 is increased and a high output mode that is a second control mode executed when output torque of the rotating electric machine 1 is increased can be executed by the electronic control device 80 provided in the electric vehicle 100 in which the rotating electric machine 1 is mounted. The high rotation mode is a mode in which the electronic control device 80 controls the power control unit 75 and energization of the field coil 6A and the field coil 6B is not performed when the rotating electric machine 1 is rotating at high speed (when torque load is small) or there is no load. The high output mode is a mode in which the electronic control device 80 controls the power control unit 75 and energization of the field coil 6A and the field coil 6B is performed when the rotating electric machine 1 is at a high output (at high load). Note that selection of each of the high rotation mode and the high output mode is arbitrarily determined and performed by the electronic control device 80 on the basis of required torque, a required rotation speed or the like required according to a pressed amount of an accelerator by a driver, a traveling state of the electric vehicle 100 or the like in the electric vehicle 100 in which the rotating electric machine 1 is mounted, for example.

Figure 4:
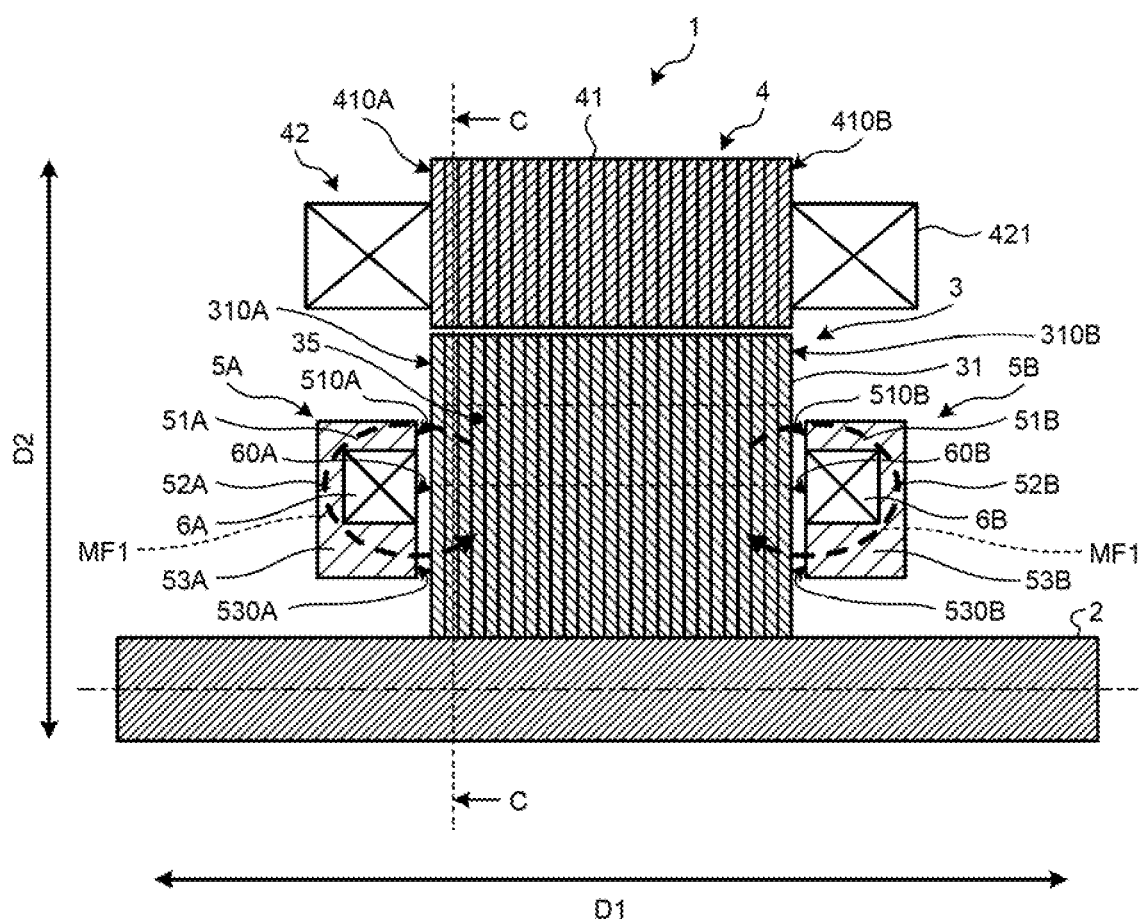
FIG. 4 is a cross-sectional view along the axis of the rotating electric machine according to the first embodiment, the view illustrating a flow of magnet magnetic flux in a high rotation mode.
Figure 5:
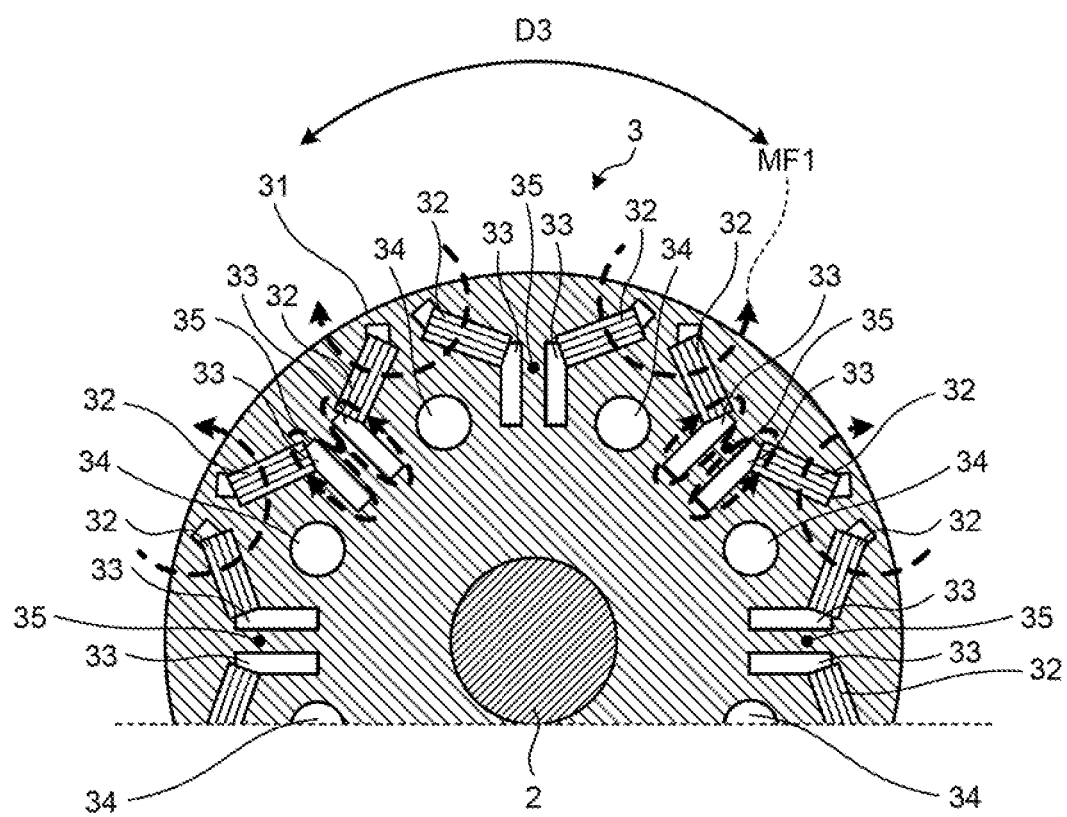
FIG. 5 is a cross-sectional view of the rotor along a line C-C in FIG. 4, the view illustrating the flow of the magnet magnetic flux in the high rotation mode.

FIG. 4 is a cross-sectional view along the axis of the rotating electric machine 1 according to the first embodiment, the view illustrating a flow of magnet magnetic flux MF1 in the high rotation mode. Note that in the cross section of the rotating electric machine 1 illustrated in FIG. 4, only half of the rotor 3 and the stator 4 are illustrated. Also, in FIG. 4, a flow of the magnet magnetic flux MF1 is indicated by a dashed arrow. FIG. 5 is a cross-sectional view of the rotor 3 along a line C-C in FIG. 4, the view illustrating the flow of the magnet magnetic flux MF1 in the high rotation mode. Note that in FIG. 5, the flow of the magnet magnetic flux MF1 is indicated by a dashed arrow.

In the rotating electric machine 1 according to the first embodiment, since the field coils 6A and 6B are not energized in the high rotation mode, a part of the magnet magnetic flux MF1 generated by the permanent magnets 32 leaks to the central bridge portions 35 of the rotor core 31 and an amount of the magnet magnetic flux MF1 that short-circuits in the rotor core 31 is increased, as illustrated in FIG. 5. Also, as illustrated in FIG. 4, in the rotating electric machine 1 according to the first embodiment, an end surface 510A of an outer wall 51A in the field yokes 5A and 5B and the central bridge portions 35 face each other. Thus, a part of the magnet magnetic flux MF1 flows from the central bridge portions 35 to the outer walls 51A and 51B, and the part of the magnet magnetic flux MF1 also short-circuits to the field yokes 5A and 5B.

Accordingly, in the high rotation mode, the magnet magnetic flux MF1 that flows from the permanent magnets 32 of the rotor core 31 toward the stator core 41 is reduced, and a back electromotive voltage can be reduced. Thus, it is possible to realize high rotation (to increase rotation speed). Also, a drag loss can be reduced by reduction of the back electromotive voltage.

Figure 6:
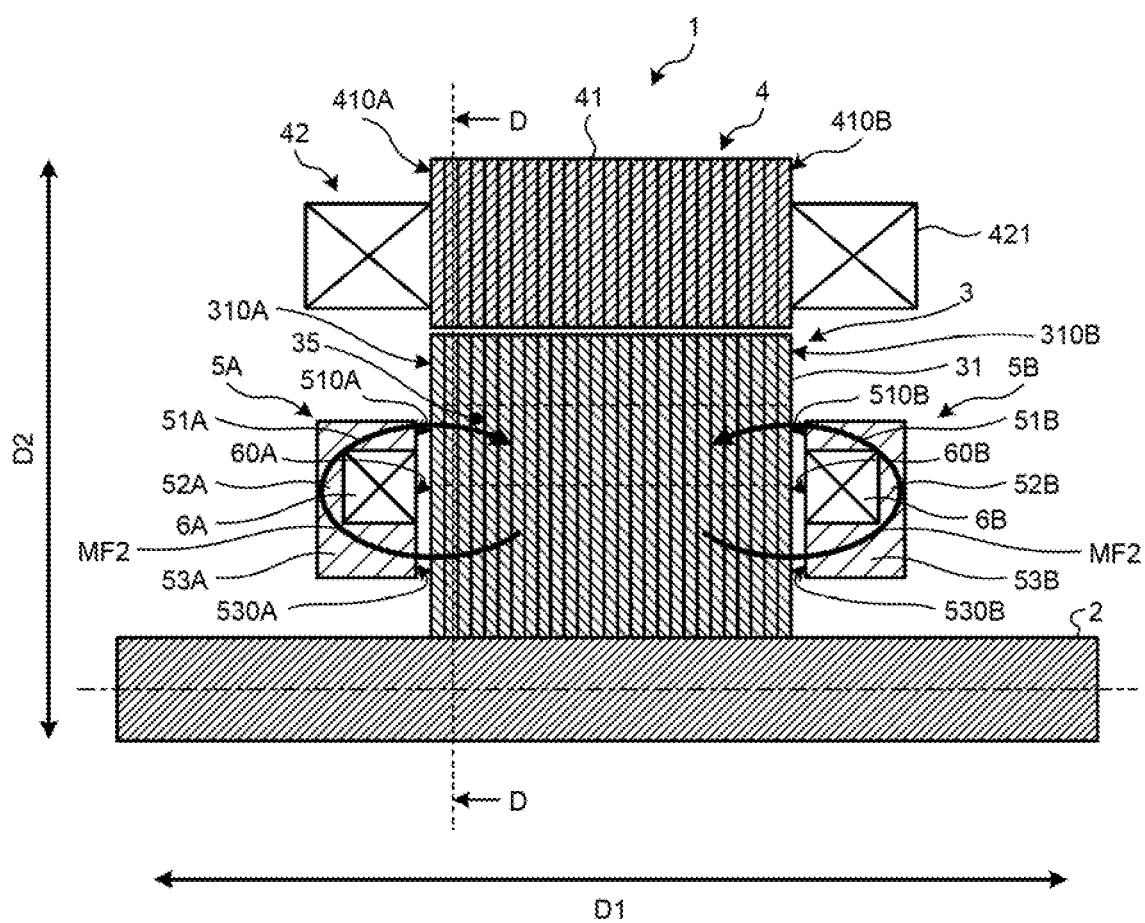
FIG. 6 is a cross-sectional view along the axis of the rotating electric machine according to the first embodiment, the view illustrating a flow of field magnetic flux in a high output mode.
Figure 7:
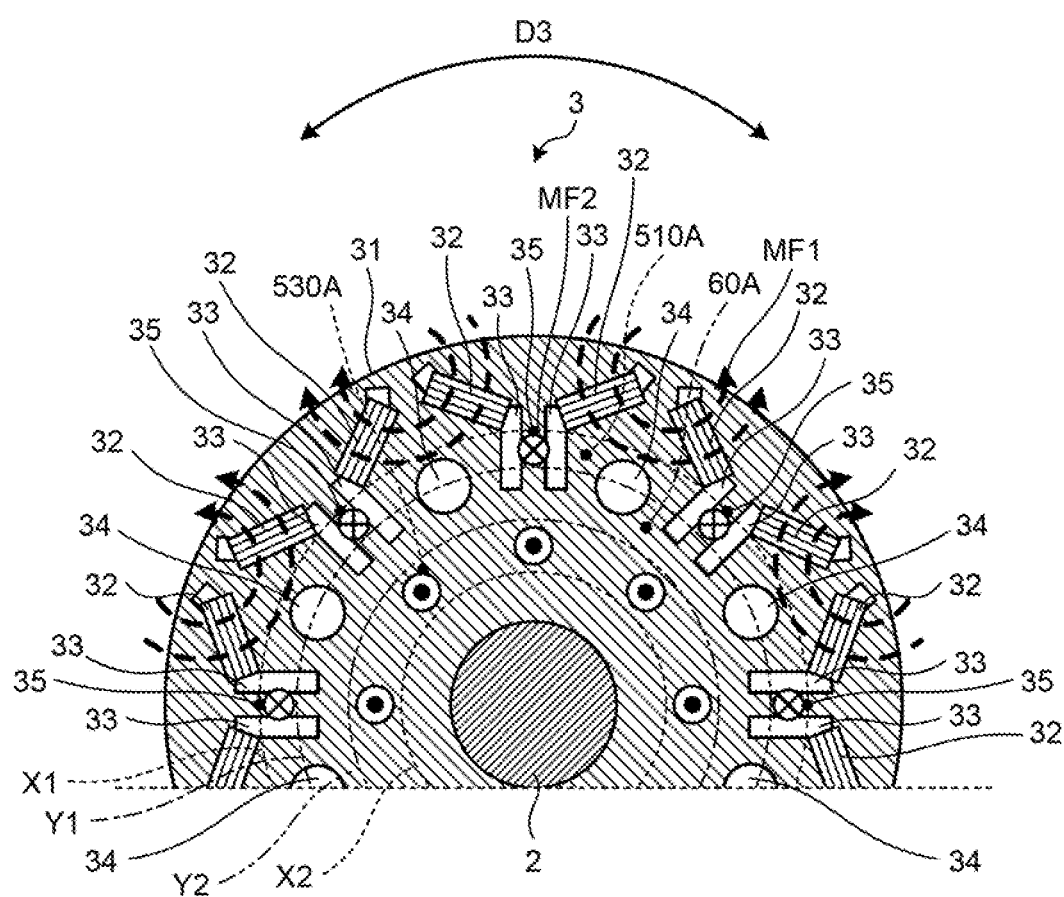
FIG. 7 is a cross-sectional view of the rotor along a line D-D in FIG. 6, the view illustrating flows of the magnet magnetic flux and the field magnetic flux in the high output mode.

FIG. 6 is a cross-sectional view along the axis of the rotating electric machine 1 according to the first embodiment, the view illustrating a flow of field magnetic flux MF2 in the high output mode. Note that in the cross section of the rotating electric machine 1 illustrated in FIG. 6, only half of the rotor 3 and the stator 4 are illustrated. Also, a flow of the field magnetic flux MF2 is indicated by a solid arrow in FIG. 6. FIG. 7 is a cross-sectional view of the rotor 3 along a line D-D in FIG. 6, the view illustrating flows of the magnet magnetic flux MF1 and the field magnetic flux MF2 in the high output mode. Note that in FIG. 7, the flow of the magnet magnetic flux MF1 is indicated by a dashed arrow. Also, in FIG. 7, a symbol with a black circle (•) in ○ expresses that the field magnetic flux MF2 flows from a back side on a plane of paper to a front side on the plane of paper. Also, a symbol with × in ○ expresses that the field magnetic flux MF2 flows from the front side on the plane of paper to the back side on the plane of paper.

In the rotating electric machine 1 according to the first embodiment, the power control unit 75 is controlled by the electronic control device 80 and the field coils 6A and 6B are energized in the high output mode. Then, as illustrated in FIG. 6, by energization of the field coil 6A, a magnetic circuit in a clockwise direction in FIG. 6 in which circuit the field magnetic flux MF2 flows in the inner wall 53A, the end wall 52A, the outer wall 51A, and the rotor core 31 in this order is formed in a case where the inner wall 53A of the field yoke 5A is viewed as a starting point. Also, as illustrated in FIG. 6, when the field coil 6B is energized, a magnetic circuit in which the field magnetic flux MF2 flows in a counterclockwise direction in FIG. 6 in the inner wall 53B, the end wall 52B, the outer wall 51B, and the rotor core 31 in this order is formed in a case where the inner wall 53B of the field yoke 5B is viewed as a starting point.

From the above, as illustrated in FIG. 6, in the high output mode, the field magnetic flux MF2 flows from the end surface 510A of the outer wall 51A in the field yoke 5A to the central bridge portions 35 of the rotor core 31. Also, similarly, the field magnetic flux MF2 flows from an end surface 510B of an outer wall 51B in the field yoke 5B to the central bridge portions 35 of the rotor core 31. Thus, the central bridge portions 35 of the rotor core 31 is saturated with the field magnetic flux MF2.

In such a manner, in the high output mode, the central bridge portions 35 of the rotor core 31 is saturated with the field magnetic flux MF2, whereby it is possible to control leakage of a part of the magnet magnetic flux MF1 generated by the permanent magnets 32 to the central bridge portions 35, and to reduce an amount of the magnet magnetic flux MF1 that short-circuits in the rotor core 31 compared to a case of the high rotation mode. Thus, since the magnet magnetic flux MF1 that flows from the permanent magnets 32 of the rotor core 31 toward the stator core 41 is increased compared to a case of the high rotation mode, it is possible to use the magnet magnetic flux MF1 effectively and to increase output torque.

Also, in the rotating electric machine 1 according to the first embodiment, interference between the magnet magnetic flux MF1 and the field magnetic flux MF2 can be made less likely to occur since the magnetic flux leakage controlling holes 34 are provided as non-magnetic regions in positions between the plurality of central bridge portions 35 in the circumferential direction D3.

Figure 8:
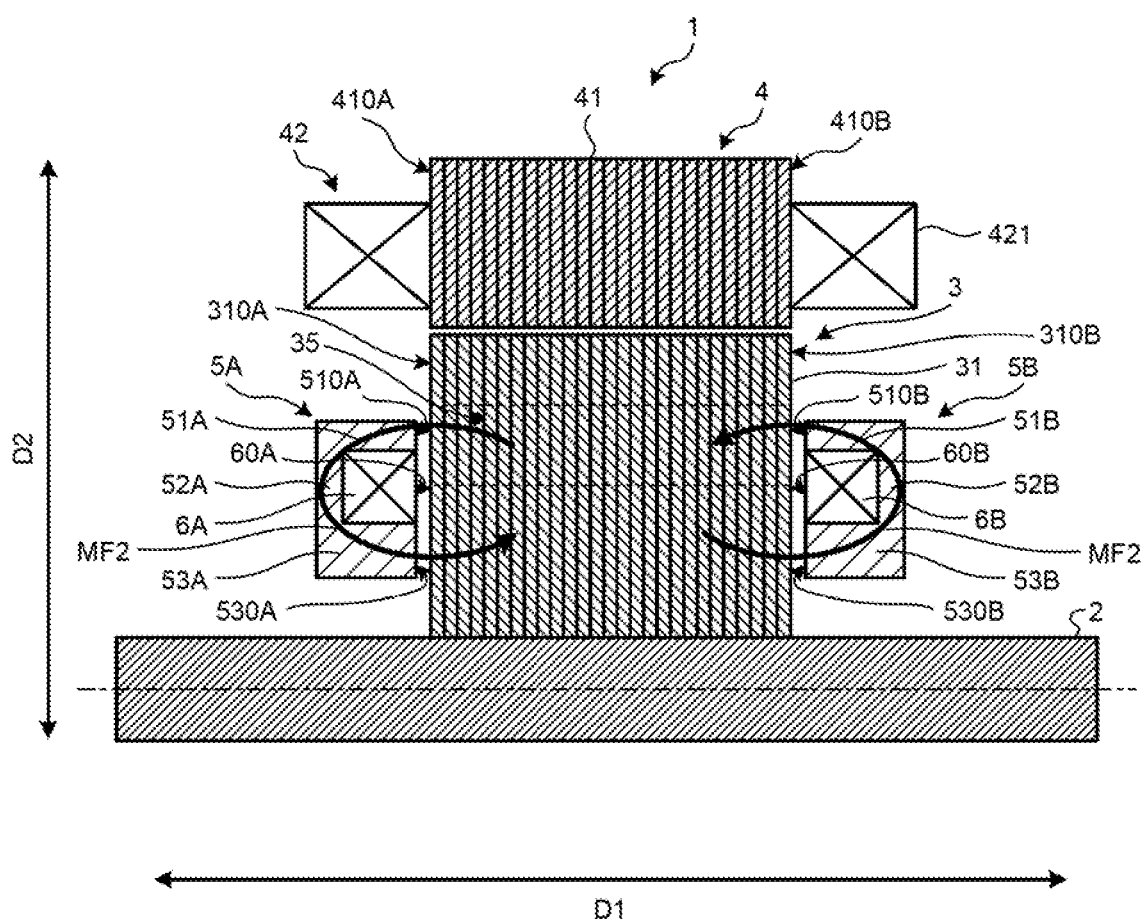
FIG. 8 is a cross-sectional view along the axis of the rotating electric machine according to the first embodiment, the view illustrating a different example of the flow of the field magnetic flux in the high output mode.

Note that in the rotating electric machine 1 according to the first embodiment, energization directions with respect to the field coils 6A and 6B may be the same or opposite. In other words, a flowing direction of the field magnetic flux MF2 generated by the field coils 6A and 6B may be the clockwise direction in FIG. 6 on a side of the field coil 6A and may be the counterclockwise direction in FIG. 6 on a side of the field coil 6B as illustrated in FIG. 7, or may be a counterclockwise direction in FIG. 8 in both of the field coils 6A and 6B as illustrated in FIG. 8. That is, it is sufficient to make the field magnetic flux MF2 generated by the field coils 6A and 6B flow in the central bridge portions 35 of the rotor core 31 and to saturate the central bridge portions 35 with the field magnetic flux MF2.

Figure 9:
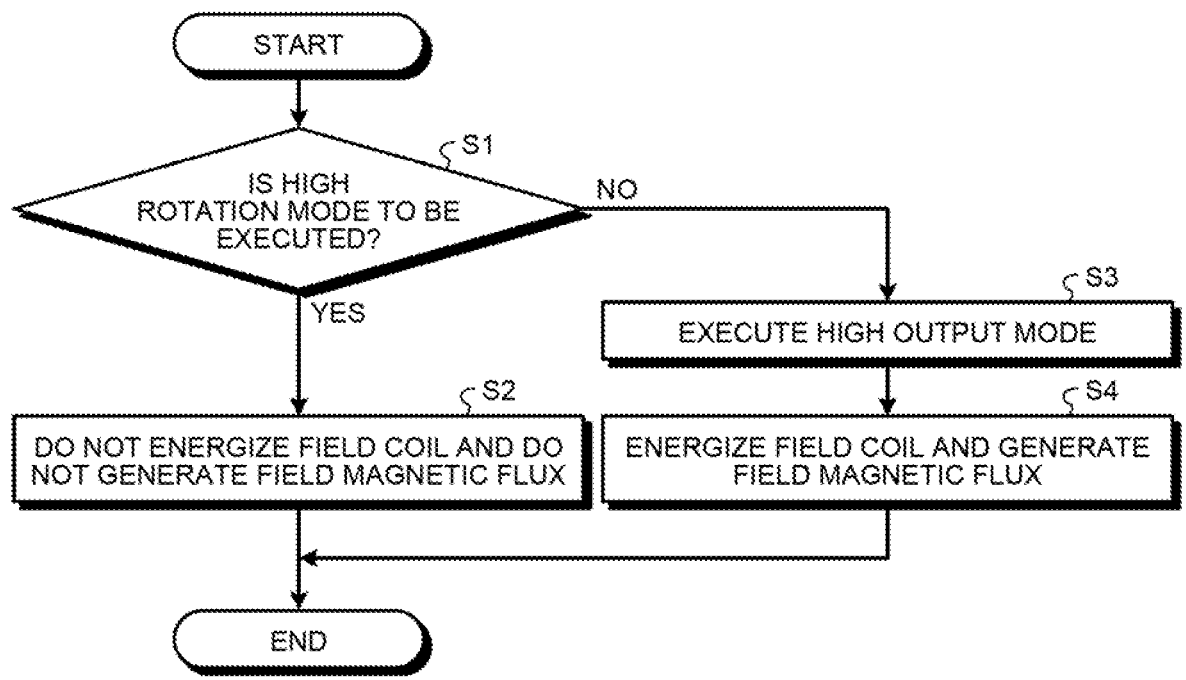
FIG. 9 is a flowchart illustrating an example of control of the high rotation mode and the high output mode of the rotating electric machine which control is performed by an electronic control device.

FIG. 9 is a flowchart illustrating an example of control of the high rotation mode and the high output mode of the rotating electric machine 1 which control is performed by the electronic control device 80.

First, the electronic control device 80 determines whether to execute the high rotation mode (Step S1). In a case of determining to execute the high rotation mode (Yes in Step S1), the electronic control device 80 controls the power control unit 75, does not energize the field coils 6A and 6B, does not generate the field magnetic flux MF2 (Step S2), and ends the series of control. Accordingly, it is possible to make a part of the magnet magnetic flux MF1 leak to the central bridge portions 35 of the rotor core 31, to reduce a back electromotive voltage, and to increase a rotation speed.

On the other hand, in a case of determining not to execute the high rotation mode (No in Step S1), the electronic control device 80 executes the high output mode (Step S3). Then, the electronic control device 80 controls the power control unit 75, energizes the field coils 6A and 6B, generates the field magnetic flux MF2 (Step S4), and ends the series of control. Accordingly, it is possible to make the field magnetic flux MF2 pass through the central bridge portions 35, and to control leakage of a part of the magnet magnetic flux MF1 to the central bridge portions 35. Thus, it is possible to use the magnetic flux MF1 efficiently and to increase an output.

In such a manner, the rotating electric machine 1 according to the first embodiment can increase both a rotation speed and an output by adjusting an amount of the magnet magnetic flux MF1 that leaks to the central bridge portions 35 of the rotor core 31.

Note that in the rotating electric machine 1 according to the first embodiment, it is preferable not to energize the field coils 6A and 6B in the high rotation mode when it is considered to reduce back electromotive force at maximum. On the other hand, when the back electromotive force can be reduced to a degree that causes no problem in practical use, current lower than that in the high output mode may be made to flow in the field coils 6A and 6B in the high rotation mode in such a manner that the field magnetic flux MF2 can be generated in a degree in which the central bridge portions 35 of the rotor core 31 are not saturated with the field magnetic flux MF2 and a part of the magnet magnetic flux MF1 leaks to the central bridge portions 35 to some extent.

Second Embodiment

In the following, a second embodiment of a rotating electric machine and a method of controlling the rotating electric machine according to the present disclosure will be described. Note that a description of a part that is in common with the rotating electric machine 1 according to the first embodiment will be arbitrarily omitted. Also, in the present embodiment, a case of applying the rotating electric machine according to the second embodiment to an electric vehicle 100 similarly to the rotating electric machine 1 according to the first embodiment will be described as an example.

Figure 10:
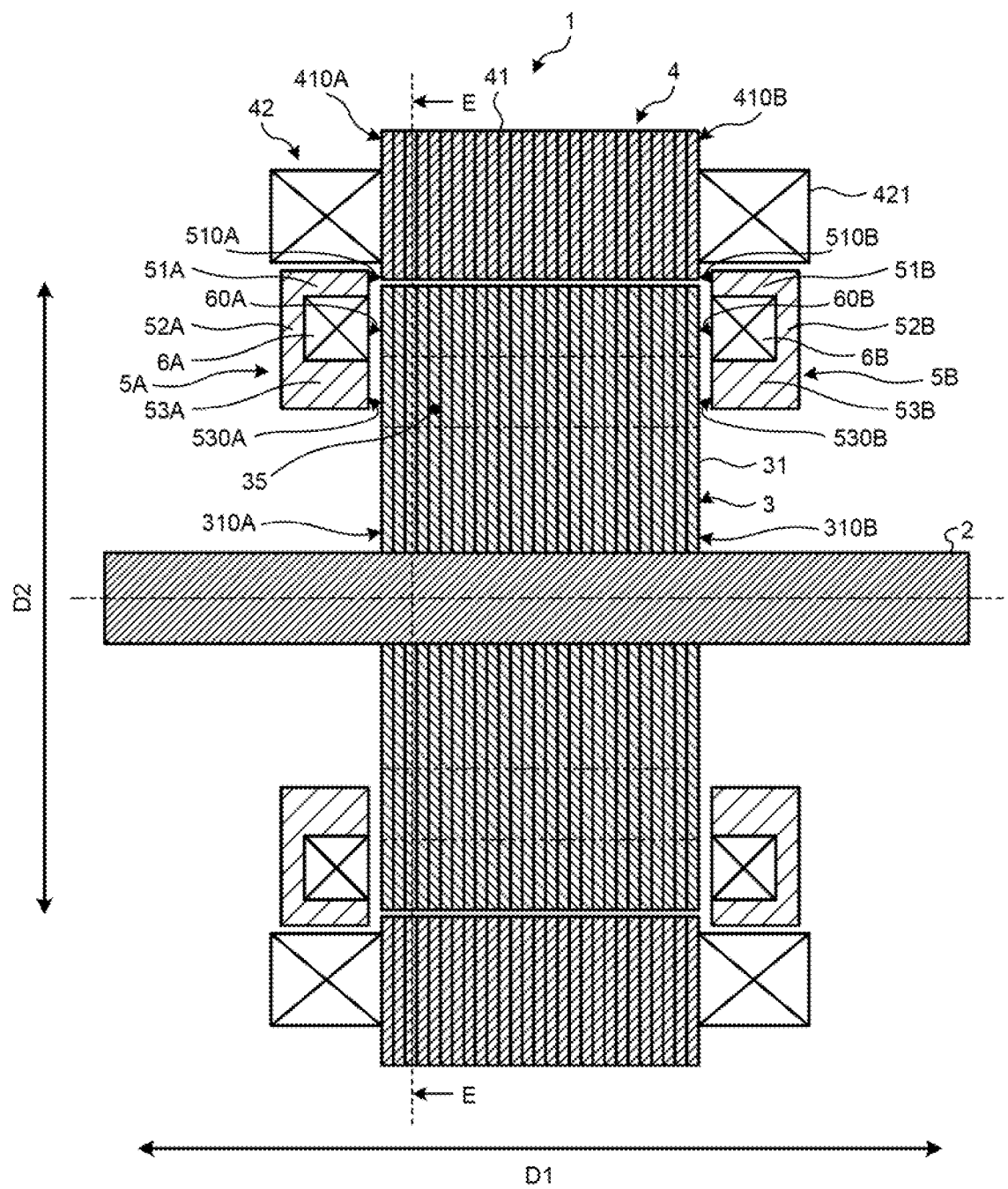
FIG. 10 is a cross-sectional view along an axis of a rotating electric machine according to a second embodiment.
Figure 11:
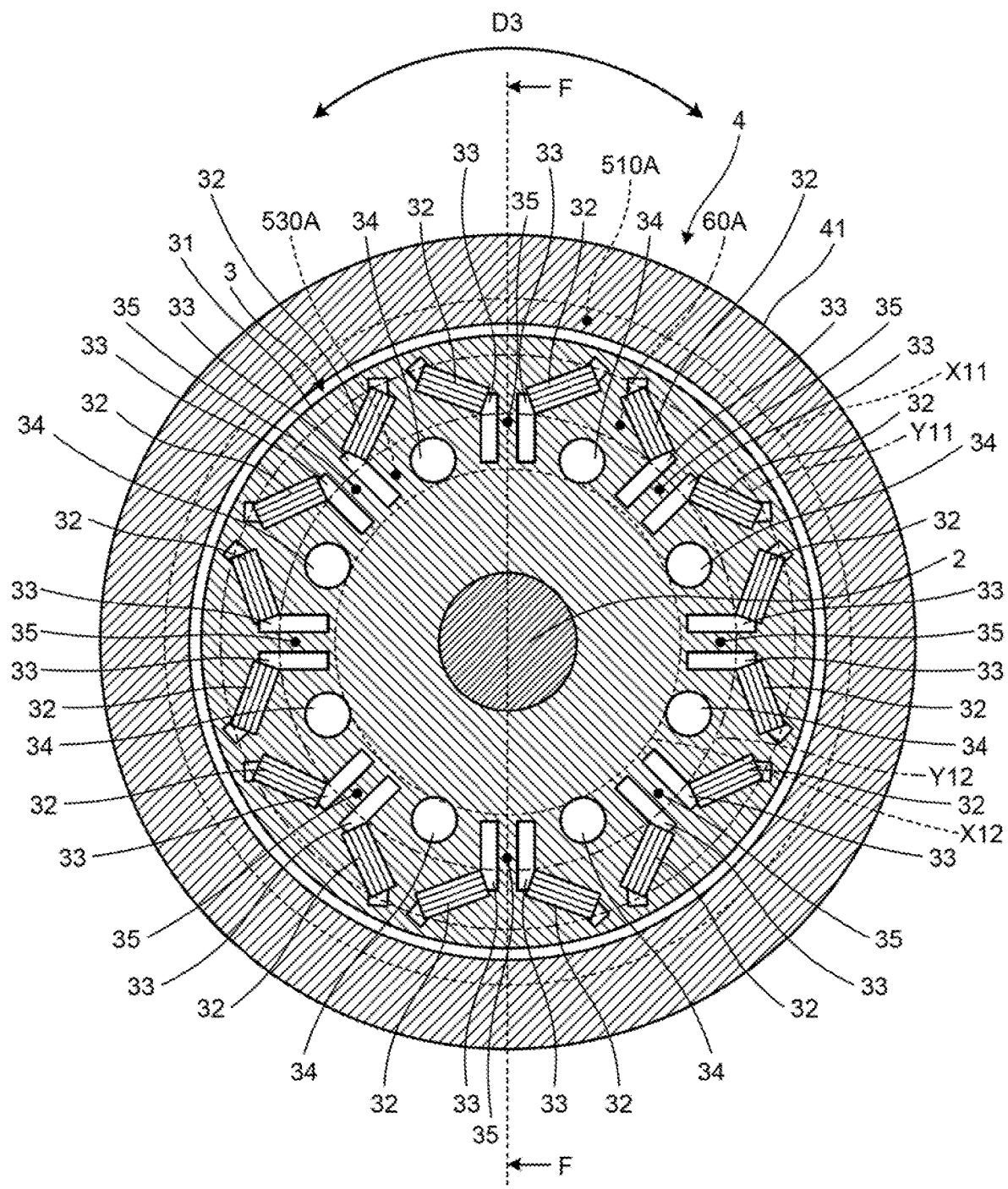
FIG. 11 is a cross-sectional view of the rotating electric machine along a line E-E in FIG. 10.

FIG. 10 is a cross-sectional view along an axis of a rotating electric machine 1 according to the second embodiment. FIG. 11 is a cross-sectional view of the rotating electric machine 1 along a line E-E in FIG. 10. Note that FIG. 10 is a cross-sectional view of the rotating electric machine 1 in a position corresponding to a line F-F in FIG. 11. Also, in FIG. 11, a first broken line circle X11, a first two-dot chain line circle Y11, a second two-dot chain line circle Y12, and a second broken line circle X12 are illustrated in this order from an outer side toward an inner side in a radial direction D2. Then, in FIG. 11, a position of an end surface 510A of an outer wall 51A in a field yoke 5A is expressed by a region sandwiched by the first broken line circle X11 and the second two-dot chain line circle Y11. Also, in FIG. 11, a position of an end surface 60A in a field coil 6A is expressed by a region sandwiched by the first two-dot chain line circle X11 and the second two-dot chain line circle Y12. Also, in FIG. 11, a position of an end surface 530A of an inner wall 53A in the field yoke 5A is expressed by a region sandwiched by the second two-dot chain line circle Y12 and the second broken line circle X12.

As illustrated in FIG. 10, in the rotating electric machine 1 according to the second embodiment, end surfaces 510A and 510B of outer walls 51A and 51B of field yokes 5A and 5B, end surfaces 310A and 310B of a rotor core 31, and end surfaces 410A and 410B of a stator core 41 face each other at a predetermined interval in an axial direction D1. Also, end surfaces 530A and 530B in the axial direction D1 of inner walls 53A and 53B of the field yokes 5A and 5B respectively face the end surfaces 310A and 310B of the rotor core 31 at a predetermined interval in the axial direction D1.

Then, as illustrated in FIG. 10, when the field yoke 5A is focused on, the end surface 510A of the outer wall 51A in the field yoke 5A faces, in the axial direction D1, an inner peripheral edge of the stator core 41 and an outer peripheral edge of the rotor core 31. Also, the end surface 530A of the inner wall 53A in the field yoke 5A faces, in the axial direction D1, all central bridge portions 35 provided in the rotor core 31.

Note that in the field yoke 5B, the end surface 510B of the outer wall 51B in the field yoke 5B similarly faces, in the axial direction D1, the inner peripheral edge of the stator core 41 and the outer peripheral edge of the rotor core 31. Also, the end surface 530B of the inner wall 53B in the field yoke 5B faces, in the axial direction D1, all the central bridge portions 35 provided in the rotor core 31.

In the rotating electric machine 1 according to the second embodiment, it is preferable that the field yokes 5A and 5B and the field coils 6A and 6B are arranged on an inner side in the radial direction D2 of a coil end 421 of a stator coil 42 and at least a part of the field yokes 5A and 5B and the field coils 6A and 6B overlaps with the coil end 421 when an inner side is viewed from an outer side in the radial direction D2. Accordingly, it is possible to control an increase in a dimension of the rotating electric machine 1 in the axial direction D1.

Also, as illustrated in FIG. 10, in the rotating electric machine 1 according to the second embodiment, the inner walls 53A and 53B face the central bridge portions 35 in the axial direction D1, and the field yokes 5A and 5B are greatly separated from the shaft 2 in the radial direction D2. Thus, a space that is formed around the shaft 2 and between the shaft 2 and the field yokes 5A and 5B in the radial direction D2 can be effectively used. Thus, for example, a bearing and a rotation sensor (resolver) can be arranged in the space, and the dimension of the rotating electric machine 1 in the axial direction D1 can be reduced.

Figure 12:
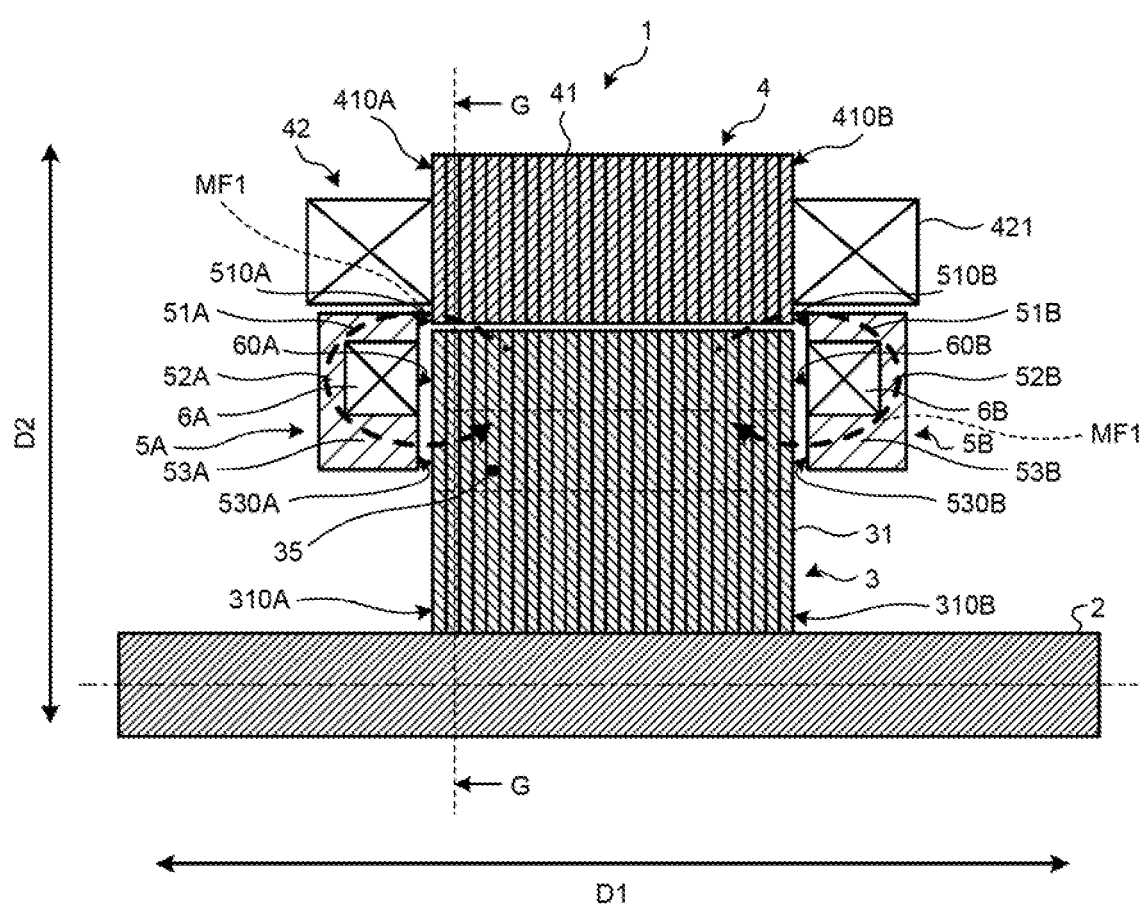
FIG. 12 is a cross-sectional view along the axis of the rotating electric machine according to the second embodiment, the view illustrating a flow of magnet magnetic flux in a high rotation mode.
Figure 13:
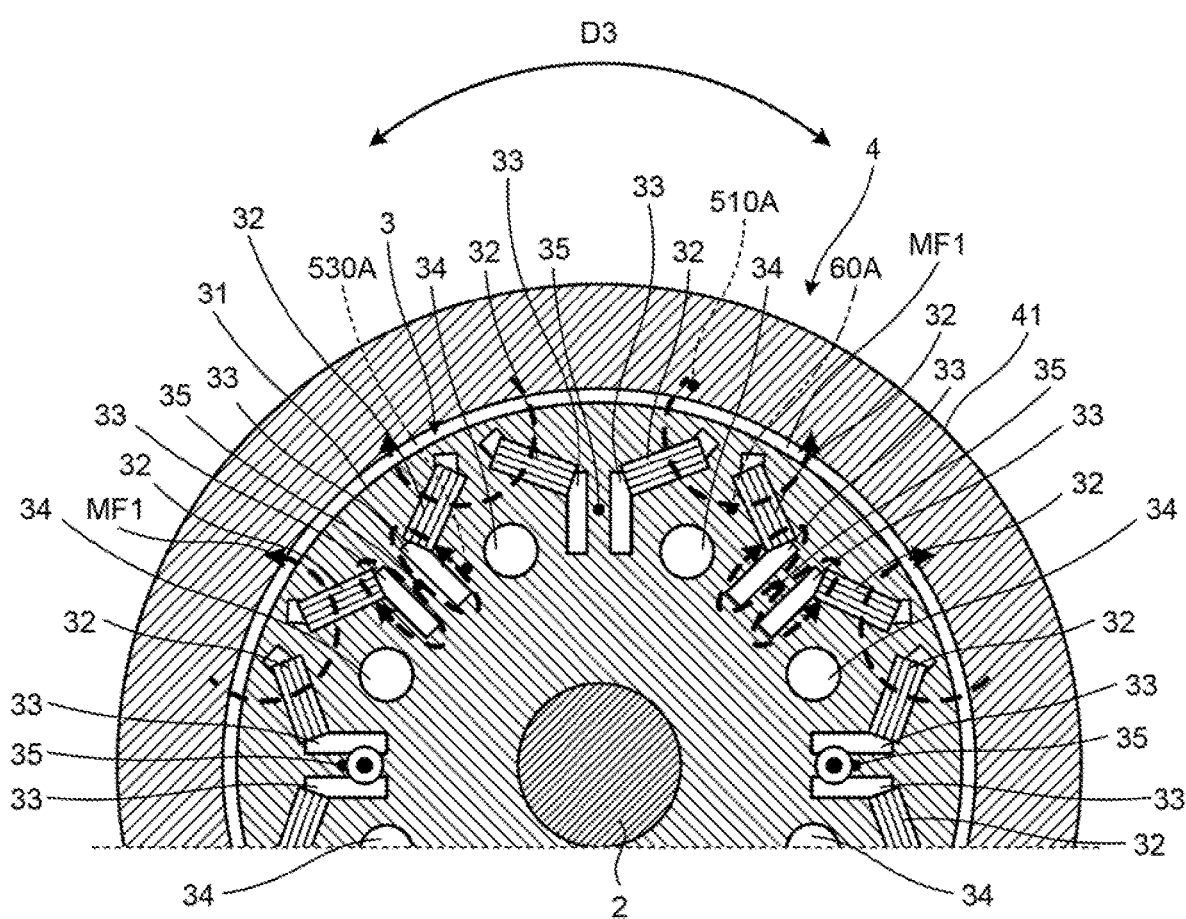
FIG. 13 is a cross-sectional view of the rotating electric machine along a line G-G in FIG. 12, the view illustrating the flow of the magnet magnetic flux in the high rotation mode.

FIG. 12 is a cross-sectional view along the axis of the rotating electric machine 1 according to the second embodiment, the view illustrating a flow of magnet magnetic flux MF1 in a high rotation mode. Note that in the cross section of the rotating electric machine 1 illustrated in FIG. 12, only half of a rotor 3 and a stator 4 are illustrated. Also, in FIG. 12, a flow of the magnet magnetic flux MF1 is indicated by a dashed arrow. FIG. 13 is a cross-sectional view of the rotating electric machine 1 along a line G-G in FIG. 12, the view illustrating the flow of the magnet magnetic flux MF1 in the high rotation mode. Note that in FIG. 13, the flow of the magnet magnetic flux MF1 is indicated by a dashed arrow.

In the rotating electric machine 1 according to the second embodiment, the power control unit 75 is controlled by the electronic control device 80 and the field coils 6A and 6B are not energized in the high rotation mode. Accordingly, a part of the magnet magnetic flux MF1 generated by permanent magnets 32 leaks to the central bridge portions 35 of the rotor core 31 and an amount of the magnet magnetic flux MF1 that short-circuits in the rotor core 31 is increased, as illustrated in FIG. 13. Also, in the high rotation mode, since field magnetic flux MF2 does not flow in the field yokes 5A and 5B, a part of the magnet magnetic flux MF1 flows to the field yokes 5A and 5B through the outer peripheral edge of the rotor core 31, the inner peripheral edge of the stator core 41 and the like, and short-circuits as illustrated in FIG. 12.

Accordingly, in the high rotation mode, the magnet magnetic flux MF1 that flows from the permanent magnets 32 of the rotor core 31 toward the stator core 41 is reduced, and a back electromotive voltage can be reduced. Thus, it is possible to realize high rotation (to increase rotation speed). Also, a drag loss can be reduced by reduction of the back electromotive voltage.

Figure 14:
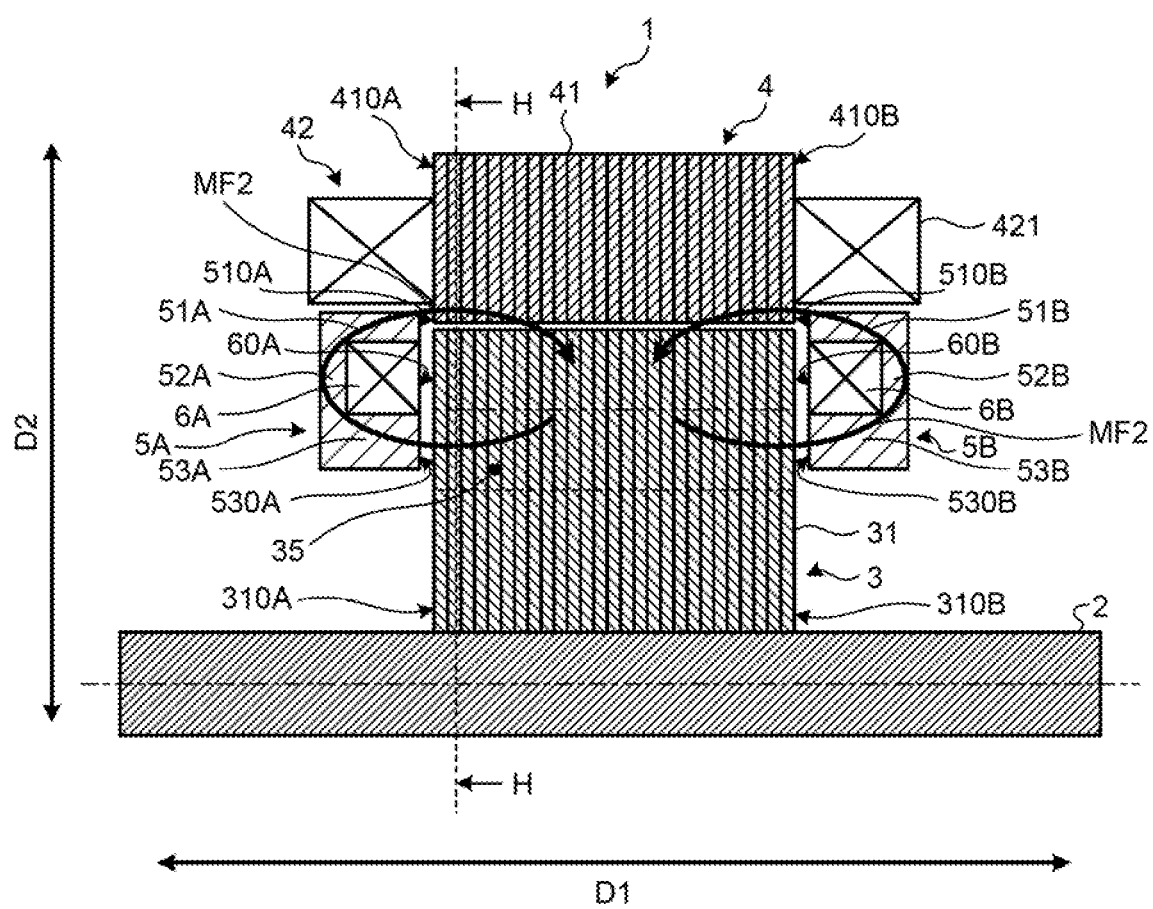
FIG. 14 is a cross-sectional view along the axis of the rotating electric machine according to the second embodiment, the view illustrating a flow of field magnetic flux in a high output mode.
Figure 15:
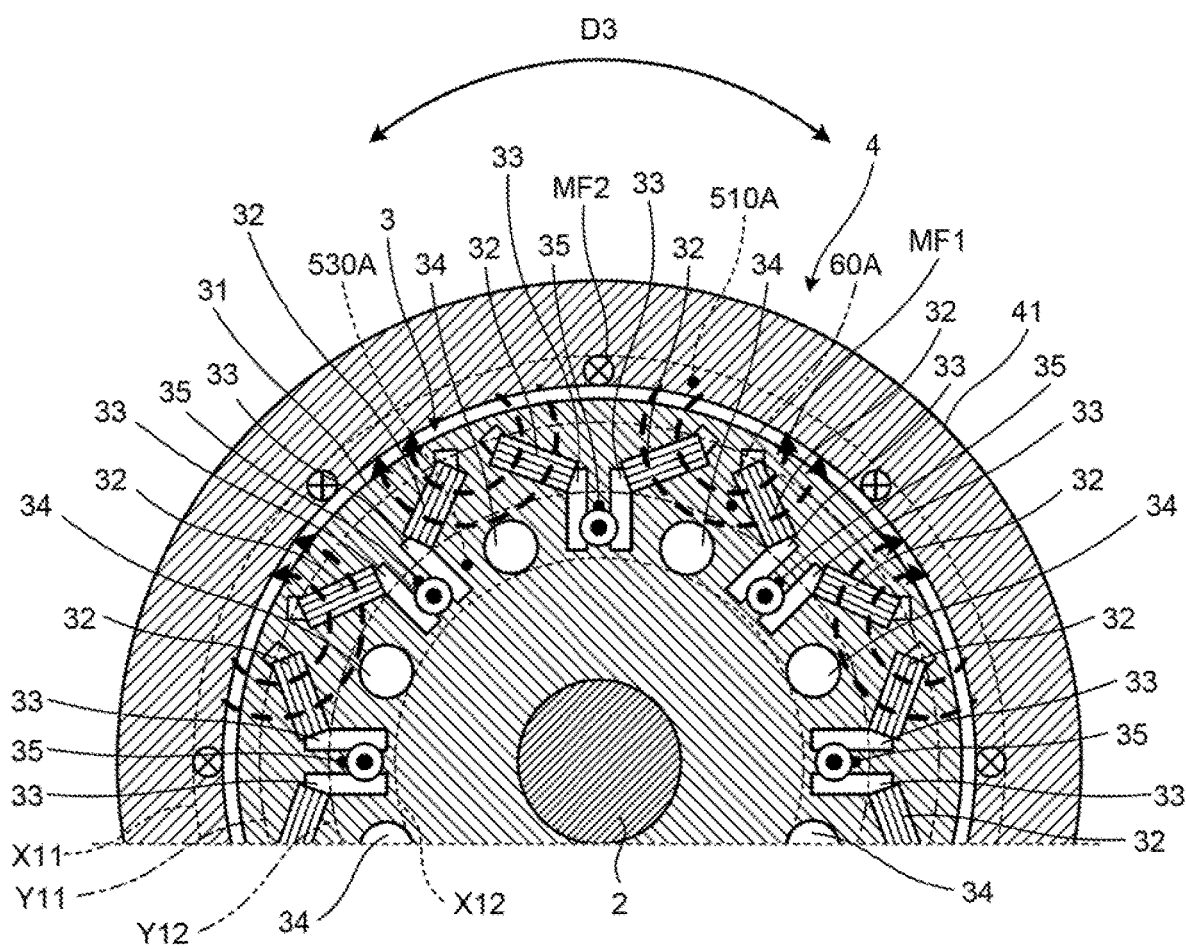
FIG. 15 is a cross-sectional view of the rotor along a line H-H in FIG. 14, the view illustrating flows of the magnet magnetic flux and the field magnetic flux in the high output mode.

FIG. 14 is a cross-sectional view along the axis of the rotating electric machine 1 according to the second embodiment, the view illustrating a flow of the field magnetic flux MF2 in a high output mode. Note that in the cross section of the rotating electric machine 1 illustrated in FIG. 14, only half of the rotor 3 and the stator 4 are illustrated. Also, in FIG. 14, a flow of the field magnetic flux MF2 is indicated by a solid arrow. FIG. 15 is a cross-sectional view of the rotor 3 along a line H-H in FIG. 14, the view illustrating flows of the magnet magnetic flux MF1 and the field magnetic flux MF2 in the high output mode. Note that in FIG. 15, the flow of the magnet magnetic flux MF1 is indicated by a dashed arrow. Also, in FIG. 15, a symbol with a black circle (•) in ○ expresses that the field magnetic flux MF2 flows from a back side on a plane of paper to a front side on the plane of paper. Also, a symbol with × in ○ expresses that the field magnetic flux MF2 flows from the front side on the plane of paper to the back side on the plane of paper.

As illustrated in FIG. 14, in the rotating electric machine 1 according to the second embodiment, the power control unit 75 is controlled by the electronic control device 80 and the field coil 6A is energized in the high output mode. Accordingly, a magnetic circuit in a clockwise direction in FIG. 14 in which circuit the field magnetic flux MF2 flows in the inner wall 53A, an end wall 52A, the outer wall 51A, the stator core 41, and the rotor core 31 in this order is formed when viewed with the inner wall 53A of the field yoke 5A as a starting point. Here, the field magnetic flux MF2 that flows from the stator core 41 to the rotor core 31 flows to the inner wall 53A through the central bridge portions 35 of the rotor core 31. Also, as illustrated in FIG. 14, when the field coil 6B is energized, a magnetic circuit in which the field magnetic flux MF2 flows in a counterclockwise direction in FIG. 14 in the inner wall 53B, an end wall 52B, the outer wall 51B, the stator core 41, and the rotor core 31 in this order is formed in a case where the inner wall 53B of the field yoke 5B is viewed as a starting point. Here, the field magnetic flux MF2 that flows from the stator core 41 to the rotor core 31 flows to the inner wall 53B through the central bridge portions 35 of the rotor core 31.

That is, in the high output mode, the field magnetic flux MF2 is made to flow in the central bridge portions 35 of the rotor core 31, and the central bridge portions 35 are saturated with the field magnetic flux MF2, as illustrated in FIG. 15. In such a manner, in the high output mode, the central bridge portions 35 are saturated with the field magnetic flux MF2, whereby it is possible to control leakage of a part of the magnet magnetic flux MF1 generated by the permanent magnets 32 to the central bridge portions 35, and to reduce an amount of the magnet magnetic flux MF1 that short-circuits in the rotor core 31 compared to a case of the high rotation mode. Thus, since the magnet magnetic flux MF1 that flows from the permanent magnets 32 of the rotor core 31 toward the stator core 41 is increased compared to a case of the high rotation mode, the magnet magnetic flux MF1 can be used effectively. Furthermore, in the rotating electric machine 1 according to the second embodiment, torque due to the field magnetic flux MF2 is generated with respect to the rotor 3 since the field magnetic flux MF2 flows between the stator core 41 and the rotor core 31 in the radial direction D2. Thus, in the rotating electric machine 1 according to the second embodiment, output torque can be increased in the high output mode.

Also, in the rotating electric machine 1 according to the second embodiment, a magnetic flux leakage controlling hole 34 is provided as a non-magnetic region in a position between the plurality of central bridge portions 35 in a circumferential direction D3. Thus, it is possible to make interference between the magnet magnetic flux MF1 and the field magnetic flux MF2 less likely.

In the rotating electric machine and the method of controlling the rotating electric machine according to the present disclosure, it is possible to make the field magnetic flux, which is generated by energization of the field coil, pass from the other end in the radial direction of the field yoke to the bridge portion of the rotor core, and to saturate the bridge portion with the field magnetic flux. Accordingly, the field magnetic flux can prevent, in the bridge portion, entrance of the magnetic flux generated by the permanent magnet, and can control leakage of a part of the magnetic flux generated by the permanent magnet to the bridge portion. Thus, it is possible to increase an output by efficiently using the magnet magnetic flux. Also, by not energizing the field coil, it is possible to make a part of the magnetic flux generated by the permanent magnet leak to the bridge portion of the rotor core. Thus, it is possible to reduce a back electromotive voltage and to increase a rotation speed. Thus, the rotating electric machine and the method of controlling the rotating electric machine according to the present disclosure have an effect that an amount of magnet magnetic flux that leaks to the bridge portion of the rotor core can be adjusted.

Accordingly, in the rotating electric machine according to the present disclosure, it is possible to make field magnetic flux generated by energization of a field coil pass from the other end in a radial direction of a field yoke to a bridge portion of a rotor core, and to saturate the bridge portion by the field magnetic flux. Accordingly, the field magnetic flux can prevent, in the bridge portion, entrance of magnetic flux generated by a permanent magnet and can control leakage of a part of the magnetic flux generated by the permanent magnet to the bridge portion. Thus, it is possible to increase an output by efficiently using the magnet magnetic flux. Also, by not energizing the field coil, it is possible to make a part of the magnetic flux generated by the permanent magnet leak to the bridge portion of the rotor core. Thus, it is possible to reduce a back electromotive voltage and to increase a rotation speed. Thus, the rotating electric machine according to the present disclosure can adjust an amount of magnet magnetic flux that leaks to the bridge portion of the rotor core.

Accordingly, a magnetic circuit in which the field magnetic flux flows to the field yoke and the rotor core can be formed.

From this, it is possible to make a part of the magnetic flux generated by the permanent magnet flow to the field yoke and to cause a short circuit.

Thus, magnetic flux flowing between the rotor and the stator can be increased.

Accordingly, it is possible to reduce a dimension in the radial direction of the rotating electric machine.

Thus, it is possible to reduce a dimension in an axial direction of the rotating electric machine.

Thereby, interference between the magnet magnetic flux and the field magnetic flux can be made less likely to occur.

Thus, in a method of controlling the rotating electric machine according to the present disclosure, first control mode is executed and energization of the field coil is not performed at the time of a high rotation speed, whereby a part of the magnetic flux generated by the permanent magnet is made to leak to the bridge portion. Thus, it is possible to reduce a back electromotive voltage and to increase a rotation speed. Also, at the time of a high output, a second control mode is executed and the field coil is energized, whereby the field magnetic flux flows to and saturates the bridge portion and leakage of a part of the magnet magnetic flux to the bridge portion is controlled. Thus, it is possible to increase an output by efficiently using the magnet magnetic flux. Thus, the method of controlling the rotating electric machine according to the present disclosure can adjust an amount of magnet magnetic flux that leaks to the bridge portion of the rotor core.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotating electric machine comprising:
    a rotary shaft member that rotates about an axis;
    a rotor including an annular rotor core in which a plurality of pairs of magnet housing holes is arranged in a circumferential direction in an outer periphery and which is fixed to the rotary shaft member, each of the pairs of magnet housing holes respectively housing permanent magnets and being arranged in such a manner as to be opened in a V-shape toward an outer side in a radial direction;
    a stator including an annular stator core arranged at an interval in the radial direction with respect to the rotor, and a stator coil provided around the stator core;
    a field yoke arranged on an outer side of the rotor in an axial direction of the rotary shaft member; and
    a field coil that is provided in the field yoke and that generates field magnetic flux when energized, wherein
    a bridge portion is provided between two magnet housing holes that form the pair of magnet housing holes in the rotor core,
    wherein the field yoke includes an outermost radial end portion and an innermost radial end portion, and the outermost radial end portion of the field yoke is in a same radial position as the bridge portion or the stator core, and
    wherein, when the outermost radial end portion of the field yoke is in the same radial position as the bridge portion, the innermost radial end portion is in a same radial position as the rotor core.

2. The rotating electric machine according to claim 1, wherein the field coil and the stator coil at least partially overlap with each other in the axial direction.

3. The rotating electric machine according to claim 1, wherein a non-magnetic region is provided between the bridge portions adjacent in the circumferential direction in the rotor core.

4. A rotating electric machine comprising:
a rotary shaft member that rotates about an axis;
a rotor including an annular rotor core in which a plurality of pairs of magnet housing holes is arranged in a circumferential direction in an outer periphery and which is fixed to the rotary shaft member, each of the pairs of magnet housing holes respectively housing permanent magnets and being arranged in such a manner as to be opened in a V-shape toward an outer side in a radial direction;
a stator including an annular stator core arranged at an interval in the radial direction with respect to the rotor, and a stator coil provided around the stator core;
a field yoke arranged on an outer side of the rotor in an axial direction of the rotary shaft member; and
a field coil that is provided in the field yoke and that generates field magnetic flux when energized, wherein
a bridge portion is provided between two magnet housing holes that form the pair of magnet housing holes in the rotor core,
wherein the field yoke includes an outermost radial end portion and an innermost radial end portion, and the outermost radial end portion of the field yoke is in a same radial position as the bridge portion or the stator core, and
wherein, when the outermost radial end portion is in the same radial position as the stator core, the innermost radial end portion is in the same radial position as the bridge portion.

5. The rotating electric machine according to claim 4, wherein an end surface of the field yoke also faces the end surface of the stator core in the axial direction.

6. The rotating electric machine according to claim 5, wherein the outermost radial end portion of the field yoke is arranged on an inner side of the stator coil in the radial direction.

7. The rotating electric machine according to claim 4, wherein the field coil and the stator coil at least partially overlap with each other in the axial direction.

8. The rotating electric machine according to claim 4, wherein a nonmagnetic region is provided between the bridge portions adjacent in the circumferential direction in the rotor core.

9. A method of controlling a rotating electric machine,
the rotating electric machine including
a rotary shaft member that rotates about an axis,
a rotor including an annular rotor core in which a plurality of pairs of magnet housing holes is arranged in a circumferential direction in an outer periphery and which is fixed to the rotary shaft member, each of the pairs of magnet housing holes respectively housing permanent magnets and being arranged in such a manner as to be opened in a V-shape toward an outer side in a radial direction,
a stator including an annular stator core arranged at an interval in the radial direction with respect to the rotor, and a stator coil provided around the stator core,
a field yoke arranged on an outer side of the rotor in an axial direction of the rotary shaft member, and
a field coil that is provided in the field yoke and that generates field magnetic flux when energized,
a bridge portion being provided between two magnet housing holes that form the pair of magnet housing holes in the rotor core,
wherein the field yoke includes an outermost radial end portion and an innermost radial end portion, and the outermost radial end of the field yoke is in a same radial position as the bridge portion or the stator core, and
wherein, when the outermost radial end portion of the field yoke is in the same radial position as the bridge portion, the innermost radial end portion is in a same radial position as the rotor core,
the method comprising:
executing a first control mode of not performing energization of the field coil when a rotation speed of the rotating electric machine is to be increased; and
executing a second control mode of performing energization of the field coil when output torque of the rotating electric machine is to be increased.

* * * * *